United States Patent

[11] 3,561,492

[72] Inventors: Knut Kauder, Hannover; Herbert Bittner, Krahenwinkel, Germany
[21] Appl. No.: 733,917
[22] Filed: June 3, 1968
[45] Patented: Feb. 9, 1971
[73] Assignee: Kabel-und Metallwerke, Gutehoffnungshutte, Hannover, Germany, a corporation of Germany
[32] Priority: June 6, 1967
[33] Germany
[31] K62,485

[54] FLEXIBLE LIQUID CONDUIT
3 Claims, 1 Drawing Fig.
[52] U.S. Cl. ................................. 138/121, 138/138
[51] Int. Cl. ................................. F16l 11/12, F16l 59/00
[50] Field of Search ........................... 138/121, 122, 173, 178

[56] References Cited
UNITED STATES PATENTS
2,039,781  5/1936  Debenedetti ............... 138/121
2,870,792  1/1959  Penrose ...................... 138/121
3,058,861  10/1962  Rutter ......................... 138/121

Primary Examiner—Laverne D. Geiger
Assistant Examiner—Richard J. Sher
Attorney—Smyth, Roston & Pavitt ABSTRACT: This application discloses a corrugated pipe with folds and ridges extending around the axis and alternating along the axis. The radius of curvature of the flow-throttling folds is larger than the radius of curvature of the adjacent corrugation ridges, and half of the peak-to-peak distance of folds (or ridges) in axial direction has approximately a 1:1 ratio to the fold-to-ridge amplitude of the corrugations.

PATENTED FEB 9 1971
3,561,492
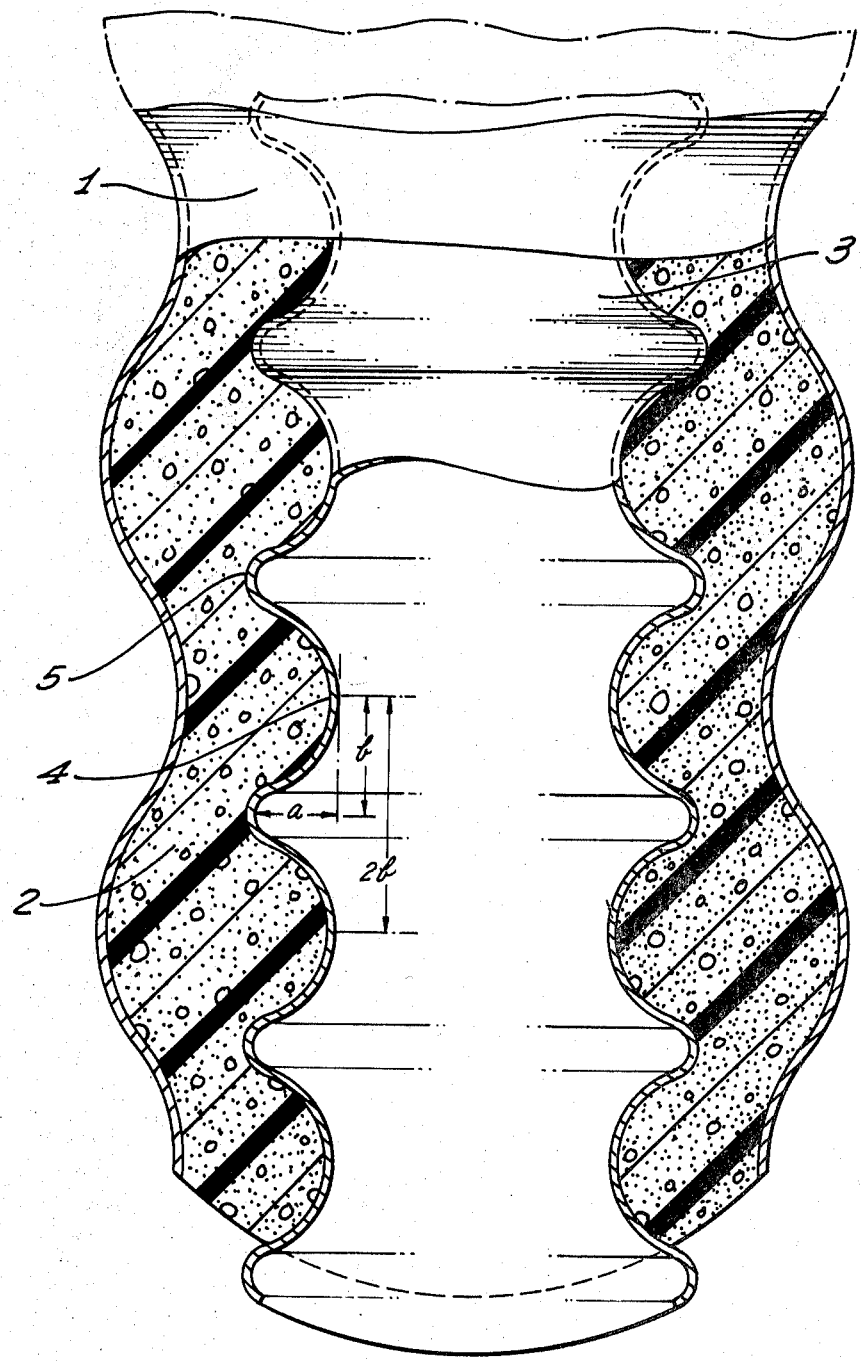
INVENTORS:
Knut Kauder
Herbert Bittner
ATTORNEYS

FLEXIBLE LIQUID CONDUIT

This invention relates to a flexible pipe or tubing as a conduit for fluids, preferably liquids, and particularly to metallic, corrugated pipes or tubes.

In order to facilitate transport and installation of pipes for liquids and gasses, etc., such pipes have been constructed to become flexible. The pipes have been provided with corrugations, established either by a pattern of ring-shaped or helical ridges and folds. Pipes with ring-shaped folds and ridges as corrugations are interconnected either through short pipe studs or even directly.

Corrugated pipes of this type as they have been used in the past, usually have the disadvantage that the resulting flow conditions in the pipe or tube have been disregarded entirely, or such conditions have been considered insufficiently. If, for example, the folds are rather shallow, their corrugation exerts only very little influence upon the flow in the pipe. However, such pipes are not very flexible and there may be little advantage to have them flexible at all. Therefore, high flexibility and low flow resistance seem to be opposite constraints.

Therefore, it is an object of the present invention to find a relationship as to the corrugation in which the pipe is adequately flexible and incurs minimal flow losses, i.e., minimal pressure losses. In accordance with the preferred embodiment of the present invention, the problem is solved in that the corrugation ridge to fold height or amplitude is related to half of what can be described as the corrugation wavelength in axial direction, at a ratio between 0.4 and 1.3, preferably at a 1:1 ratio, whereby the internal radius of curvature of the corrugation folds, producing a throttling effect inside the tube, is at least equal to, but preferably larger than, the internal radius of curvature of the corrugation ridge.

While the specification concludes with claims particularly pointing out and distinctly claiming the subject matter which is regarded as the invention, it is believed that the invention, the objects and features of the invention and further objects, features, and advantages thereof will be better understood from the following description taken in connection with the accompanying drawings, in which:

The FIG. illustrates, partially in cross section and partially in open view, a pipe, tube or conduit in accordance with the preferred embodiment of the invention. The pipe has a corrugated outer sleeve 1 of conventional construction and does not require elaboration. It is preferably a metal pipe or tube. There is a second, inner pipe or tube 3, which is also corrugated and it constitutes the conduit proper. Tube 3 in particular is constructed in accordance with the principles of the invention. The space between the two pipes or tubes, 1 and 3, is preferably filled with a thermal insulator 2, such as foam rubber or the like.

The provision of a thermal insulator 2 is, of course, necessary only in case the liquid passing through the pipes 3 has a temperature which is higher or lower than the ambient temperature. The drawing shows foam rubber as an insulator, but other materials can be used, for example, glass wool or other fibrous materials. The outer pipe 1 is provided primarily as a protective layer for the thermal insulator and should, of course, be as flexible as the inner pipe.

The pipe 3 can be regarded as having the shape of bellows. Pipe 3 has folds 4 and ridges 5 establishing the corrugations. The corrugation folds 4 provide a throttling effect on liquid when flowing in pipe 3, while ridges 5 are enlargements of the cross-sectional area for the flow. The resulting flow conditions will be discussed in detail below. The ridges, as well as the folds of the corrugation, are preferably parabolically shaped, whereby, particularly in the peak area of a ridge 5, the internal radius of curvature is significantly smaller than the radius of curvature in the bottom area of a fold 4. The height $a$ of a ridge 5 above a fold 4 is approximately equal to the axial distance $b$ from ridge to fold, which is half the axial distance from ridge-to-ridge or fold-to-fold. To state it differently, the difference $2a$ of diameters of the tube in ridge and fold regions, is about equal to the ridge-to-ridge or fold-to-fold axial distance $2b$ defining the corrugation.

A pipe corrugated in this manner is very flexible but has, in effect, a cross section offering flow resistance which is only very little higher than the flow resistance of a straight, uncorrugated pipe. Therefore, this construction establishes a flexible pipe which reconciles conditions as to flow and conditions as to mechanical construction seemingly opposed to each other.

The illustrated pipe is the preferred form of practicing the invention, but modifications shall be discussed to outline the scope of the invention. As stated, the folds 4 narrow the cross section of the pipe. Even if the radius of curvature (in axial planes) for ridges and folds are equal, one could still consider the folds as a sequence of flow restricting orifices or throttles, particularly for Reynolds numbers in the range of $10^4$ or $10^5$. These orifices or throttles are rounded and thus do not offer sharp boundary. Numerous tests led to the conclusion that for chosen maximum and minimum inner diameters of the tube, the flow resistance of the tube decreases with an increase in the number of corrugation waves per unit length, but the flow resistance decreases also if the number of corrugation waves decreases to approach a smooth pipe. It was concluded from tests that the flow resistance has, in fact, minimum value if the ratio of half the distance $a$ measured from ridge-to-ridge or from fold-to-fold in axial direction, over the ridge-to-fold amplitude $b$, is about a unity. As stated above, a ratio within the range 0.4 to 1.3 gives good results. For such ratios of the dimensions defining the corrugations, and for similar fold and ridge radii, eddies are formed in the region of enlarged inner tube diameter, near the ridges, and the liquid flow "rolls" on these eddies similar to a ball-bearing-type action, so that the flow conditions are quite favorable. Nevertheless, the sustenance of the eddies requires energy which is taken from the flowing liquid, which is the principal reason for an increase in flow losses as compared with a smooth pipe.

If now, in accordance with the preferred form of practicing the invention, and as is illustrated in the drawings, the radius of curvature of the ridges in the corrugation, is smaller than the radius of curvature of the folds, then the throttling area, as produced by a fold, can be regarded as a nozzle or as a venturi pipe, and the entire pipe can be considered as a sequence of such nozzles. Since the efficiency of a nozzle for a given relative increase of cross section is considerably larger than the efficiency of a flow-restricting orifice or throttle, it follows that the losses produced in a pipe established at such a sequence of nozzles will be lower than they would be if the pipe were constructed as a sequence of throttles. This is particularly so because in the case of a sequence of nozzles, as shown in the drawings, eddies that are effective similar to ball bearings will not form any more in the folds having the enlarged cross-sectional area, with regard to the flow. Accordingly, energy is not taken from the flow to sustain any eddies.

As stated, the ridges and folds are preferably formed as parabolas in cross section. This was found to be of specific advantage as to further reduction of flow loss. The differences in curvature are preferably selected so that the "wave flanks" where a ridge merges with the adjoining fold, run almost parallel to radial planes. The parabolically shaped valleys are preferably oriented parallel to the longitudinal axis of the pipe. This, in effect, results in the production of optimum values as far as flexibility of the pipe and flow resistance is concerned.

The invention is not limited to the embodiments described above, but all changes and modifications thereof not constituting departures from the spirit and scope of the invention are intended to be covered by the following claims.

We claim:

1. A flexible pipe as a conduit for fluids, having corrugated wall structure, the improvement comprising:
   i. a corrugation of the wall defined by axially spaced ridges and folds, the ratio between the ridge-to-fold corrugation amplitude to half of the axial ridge-to-ridge distance has a value between 0.4 to 1.3;
   ii. the cross-sectional contours of ridges and folds are parabolas, whereby radius of curvature of the corrugation folds is larger than radius of curvature of the corrugation ridges, so that the flow space through the pipe is established as a sequence of nozzles established by the corrugation folds with parabolic contour along the flow axis.

2. A pipe in accordance with claim 1, there being a thermal insulating layer around the pipe.

3. A pipe in accordance with claim 1, there being a corrugated metallic outer pipe surrounding the thermal insulation on the inner corrugated pipe.